United States Patent
Brenot et al.

[11] Patent Number: 5,569,419
[45] Date of Patent: Oct. 29, 1996

[54] CONTINUOUS FLOW PROCESS OF MOLD-MAKING OR DIE-MAKING USING A REUSABLE MIXTURE SUBSTANCE TO MAKE SELECTED FINISHED PRODUCTS

[75] Inventors: Stephen E. Brenot, R.R. 6, Box 114, Fergus Falls, Minn. 56537; Arnold G. Althoff, 16870 Court Rd. 16, Hankinson, N. Dak. 58041

[73] Assignees: Stephen E. Brenot; Arnold G. Althoff; Randy M. Schneider, all of Wahpeton, N. Dak.

[21] Appl. No.: 288,790

[22] Filed: Aug. 12, 1994

[51] Int. Cl.⁶ .......................... B29C 33/38; B29C 33/68
[52] U.S. Cl. .......................... 264/37; 264/119; 264/166; 264/221; 264/225; 264/280; 264/297.7
[58] Field of Search .............................. 264/37, 119, 166, 264/221, 225, 280, 297.7, 316, 317

[56] References Cited

U.S. PATENT DOCUMENTS

| | | | |
|---|---|---|---|
| 3,833,703 | 9/1974 | Joos | 264/166 |
| 3,961,967 | 6/1976 | Brooks | 106/38.23 |
| 4,130,436 | 12/1978 | Hauser et al. | 264/37 |
| 4,865,783 | 9/1989 | Ahonen et al. | 264/317 |
| 4,904,423 | 2/1990 | Foreman et al. | 264/37 |

FOREIGN PATENT DOCUMENTS 962683   7/1964   United Kingdom ................. 264/37

*Primary Examiner*—Robert Davis
*Attorney, Agent, or Firm*—David A. Lingbeck

[57] ABSTRACT

This invention relates to a continuous flow process of mold making or die making using a reusable bondable mixture substance to make selected finished products. The bondable mixture substance includes a mixture of preferably ventonite clay, sand, and a lubricant such as oil all mixed and bonded together so that impressions can be made in the mixture substance to make end-to-end molds or dies which are moved on a conveyor belt through a plurality of zones in which some type of work is perform on the mixture substance which is mixed and dispensed on the conveyor belt, smoothed and rolled to a specified uniform consistency, imprinted with a mold maker to form the molds or dies, injected with a hardenable material, heated to form cured finished products from the hardenable material other than metal, allowed to separate from the finished products and delivered back to the start of the process to a holding bin by another conveyor belt, and again mixed and reused to form end-to-end molds or dies for making selected finishes products such as structural materials.

10 Claims, 1 Drawing Sheet

CONTINUOUS FLOW PROCESS OF MOLD-MAKING OR DIE-MAKING USING A REUSABLE MIXTURE SUBSTANCE TO MAKE SELECTED FINISHED PRODUCTS

BACKGROUND OF THE INVENTION

This invention relates to a continuous flow process of mold-mixture or die-making using a reusable bondable mixture substance to make selected finished products including shingles for building structures, sidings, synthetic logs, panels, brick, stone, block, and lumber, all replicating wood.

Generally, permanent molds or dies used to make finished products are known in the art, and even the process of making such molds or dies is known in the art, since permanent molds and dies are typically batch processed and are very expensive and cannot be altered and changed to form other molds or dies. These molds or dies are generally made of a plastic, rubber, fiberglass, or wood or metal. Machines and tools are used to make permanent molds or dies. Once these molds and dies are made, they are permanent and cannot be reused to form new molds or dies. Further, these molds or dies are very expensive and generally cannot be reused or broken down into their individual elements for reuse. There is no known continuous flow process to make molds or dies using a reusable, bondable mixture substance to make selected finished products or to support a continuous molding of resin based products such as polyurethane, polyester, polystyrene, polyurea, or other polymers. The molds and dies in the current process are being continuously made over and over again using a finite amount of bondable mixture substance. This current process overcomes the problems associated with permanent molds or dies.

SUMMARY OF THE INVENTION

This invention relates to a continuous flow process of mold-making or die-making using a reusable, bondable mixture substance to make selected finished products, which comprises the following steps: providing a first conveyor belt having raised edges therealong, a plurality of closely-spaced pressure rollers generally aligned side by side for carrying the first conveyor belt and applying even pressure on the conveyor belt throughout to maintain equilibrium along the first conveyor belt, a second conveyor belt disposed below the first conveyor belt, and an impressionable and bondable mixture substance used to make the molds or dies; mixing the impressionable mixture substance; dispensing the mixed impressionable substance onto the first conveyor belt; grading or leveling the substance with baffles or the like; rolling the substance with baffles or the like; rolling the substance to a desired depth and consistency using cylindrical rollers; overlaying the rolled substance with a first sheet of thin stretchable plastic film; making the desired or selected impressions on the first plastic sheet and into the substance using impression-making rollers or drums; dispensing a liquified hardenable material such as polyurethane, polystyrenes, polyester, polyurea, or other polymers on the impressionable substance in the impressions; overlaying the liquified hardenable material with a second stretchable plastic sheet; heating and curing the overlayed liquified hardenable material; allowing the mixture substance to separate and drop from the finished products; and delivering the generally-granulated mixture substance back to the beginning of the process to a holding bin for reuse in making the molds or dies.

It is an objective of the present invention to produce a continuous flow process of mold-making or die-making using a reusable mixture substance to make selected finished products, which eliminates the need for special belts or mold plates used in the prior art.

Another objective of the present invention is to produce a continuous flow process of mold-making or die-making using a reusable mixture substance to make selected finished products, which eliminates the high cost of using special belts or mold plates.

Also, another objective of the present invention is to produce a continuous flow process of mold-making or die-making using a reusable mixture substance to make selected finished products which eliminates lengthy downtime normally associated with the maintenance of special belts or mold plates.

Further, another objective of the present invention is to produce a continuous flow process of mold-making or die-making using a reusable mixture substance to make selected structural elements or products which allows the user to conveniently, easily, and quickly change to the making of other products, which can be done within minutes rather than days as with the conventional methods of making molds or dies.

Also, another objective of the present invention is to produce a continuous flow process of mold-making or die-making using a reusable mixture substance to make selected structural elements or products which provides great flexibility to the user and also saves the user money because this process allows the user to effectively use his/her machinery and to shorten production lead times because this process can be quickly and efficiently changed over without lengthy downtimes.

Yet, another objective of the present invention is to produce a continuous flow process of mold-making or die-making using a reusable mixture substance to make selected structural elements or products which eliminates the expense of making permanent molds or dies which once made cannot be altered or changed.

Further objectives and advantages of the present invention will become more apparent as the description proceeds and when taken in conjunction with the accompanying drawing wherein:

DETAILED DESCRIPTION OF THE INVENTION

Figure 1:
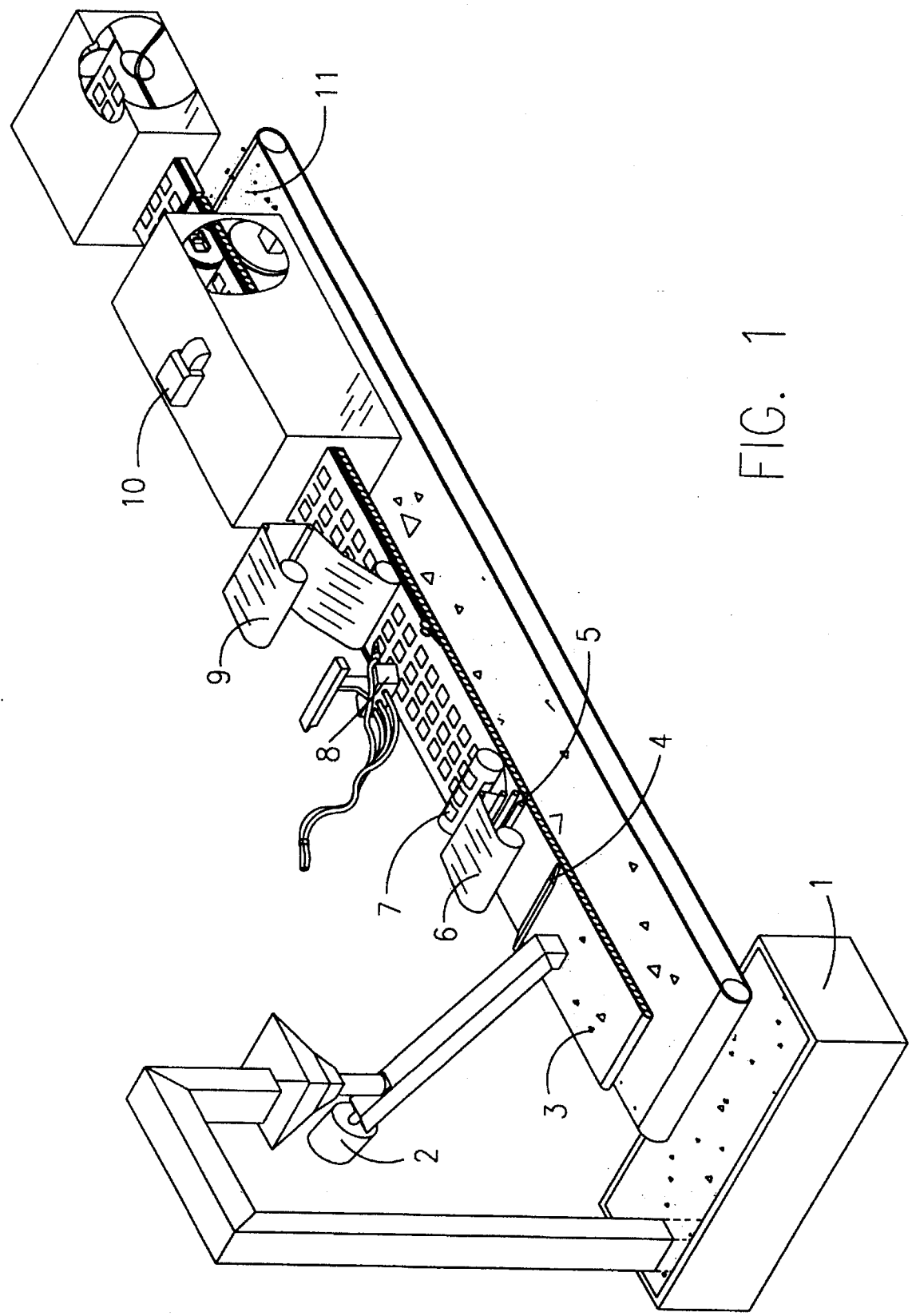
FIG. 1 is a perspective view of the mechanical system used to produce the molds or dies for this continuous flow process.

Referring to FIG. 1, the continuous flow process of mold-making or die-making using an impressionable mixture substance includes the steps of (1) providing a continuous mold-making or die-making apparatus comprising a first endless conveyor belt having raised edges; a plurality of pressure rollers aligned side by side for carrying the first conveyor belt 3 and for applying uniform constant pressure along the length of the first endless belt to maintain uniform consistency therealong so that the weight of the molds or dies won't distort the first conveyor belt 3 as the molds or dies are carried on the first conveyor belt 3; a reusable, impressionable mixture substance provided in finite bulk, the mixture substance being preferably comprised of granular material capable of bonding together along with a filler, the glandular material being of various textures and grains for producing different types of molds or dies, the finer the grain of the granular material the more detailed the molds or dies, the granular material preferably being a mixture of preferably 5% to 9% by weight of bentonite clay, approximately 2% of weight of a lubricant such as oil, and the balance being preferably silica sand as such, further the granular material alternately being a putty-like material which can be bonded and shaped to form unitary molds or dies and which can be easily separated into fine particulate matter and reused to produce molds or dies; a holding bin 1 for storing the mixture substance; an auger or elevator or lift system for continuous moving the mixture substance from the holding bin 1 to a mixer 2 to thoroughly mix the mixture substance; a feeder system preferably comprising a hopper and a spout for continuous feeding of the mixed mixture substance onto the first conveyor belt 3; a plurality of levelers or graders 4 disposed above the first conveyor belt 3 for continuous leveling of the mixed mixture substance; smoothing rollers disposed upon the first conveyor belt 3 for rolling the mixture substance to a predetermined depth and consistency; a first plastic sheet dispenser 6 disposed above the first conveyor belt 3 for dispensing a thin plastic film or sheet over the mixture substance; a mold-forming roller or drum for producing impressions in the mixture substance; liquidfied-hardenable-material dispenser for dispensing the liquidfied hardenable material onto the molds or dies; a second plastic sheet dispenser 9 for dispensing a plastic sheet over the liquified hardenable material; a heater apparatus to heat the molds or dies; a second endless conveyor belt for transporting the mixture substance back to the holding bin 1 for reuse; and a separator to divide the cured end-to-end molded structural elements and products.

Once the continuous mold-making apparatus or system is operational, this process of mold making or die making is a continuous flow process. A finite amount of impressionable mixture substance is provided and stored in the holding bin 1 and is used to make the molds or dies. Generally, the mixture substance comprises a mixture of preferably 5% to 9% by weight of bentonite clay, approximately 2% by weight of lubricant such as oil, and the balance being sand having a grain of 60 and finer. At the start up of the mold-making system, the mixture substance is generally heated up to 120 degrees Fahrenheit which effects better yield of the finished product. Once the mixture substance is heated the first time, the mixture substance probably won't need to be continuously heated in the holding bin 1 since the mixture substance is heated in the heating unit for curing the finished product.

The mixture substance is moved or lifted from the holding bin 1 to a hopper which feeds the mixture substance to a mixer 2 connected to the hopper, which mixes the mixture substance comprising bentonite clay, sand, and oil to obtain a uniform consistency therethrough. The homogenized mixture substance is then dispensed through a spout onto a moving, horizontally-disposed first conveyor belt 3 which has raised edges therealong to confine the mixture substance on the first conveyor belt 3. The moving or lifting of the mixture substance form the holding bin 1 to the hopper to the mixer 2 and then to the first conveyor belt 3 is continuous. The first conveyor belt 3 is an endless belt and moves continuously. There are zones through which the first conveyor belt 3 moves and in which work is performed on the mixture substance or on the molds or dies.

The first zone is a leveling or grading zone where a baffle or other similar device is disposed above the first conveyor belt 3 and levels the undulations of mixture substance being continuously dispensed through the spout onto the first conveyor belt 3. The dispensed quantities will vary to support the mold or die depths and consistency required to product different finished products. The second zone comprises flattening rollers 5 which are also disposed above the first conveyor belt 3 but are nearer to the surface of the first conveyor belt 3 than are the levelers or grader 4 and which roll the leveled mixture substance to a uniform depth and consistency. The flattening rollers 5 can be adjusted above the first conveyor belt 3 to obtain different depths of mixture substance depending upon the types of molds or dies needed to make different finished products. The third zone comprises a first dispenser roll 6 of thin plastic film or sheet which overlays the rolled mixture substance as the first conveyor belt 3 moves through that zone. The first plastic film or sheet is taken up by another roller located at the end of the process and can be used for packaging or even be reused to overlay the rolled mixture substance. The fourth zone includes an imprint roller or drum 7 which is closely disposed upon the first conveyor belt 3 and which has a sleeve made of rubber, copper, steel, wood, plastic, aluminum, or urethane about the roller or drum 7. The sleeve has selective positive elements or projections extending outward from the surface of the sleeve which, as the first conveyor belt 3 moves the covered mixture substance through the zone, makes impressions in the mixture substance, on the plastic sheet. The imprint roller or drum 7 rotates as the first conveyor belt 3 moves under the imprint roller or drum 7. The positive elements or projections are circumferentially disposed about the imprint roller or drum 7 and make selected end-to-end molds or dies in the mixture substance. The fifth zone comprises an injection gun 8 disposed above the first conveyor belt 3 for injecting or spraying a liquified hardenable material such as polyurethane foam, polyester, polystyrenes, or other polymers on the end-to-end molds or dies. The liquidfied hardenable material fills in the impressions made in the end-to-end molds or dies and effects a uniform surface across the molds or dies. The sixth zone includes a second dispenser roll 9 of plastic film or sheet which overlays the end-to-end molds or dies and the liquified hardenable material to confine the liquified hardenable material on the molds or dies. The seventh zone comprises a heater unit 10 through which the end-to-end molds or dies move on the first conveyor belt 3. Heat in the range of 150 degrees Fahrenheit to 200 degrees Fahrenheit is applied to the end-to-end molds or dies and expands the liquified hardenable material to form the structural elements or finished products. The hardenable material is heated and cured for approximately three minutes. Catalysts may be introduced to reduce the curing time.

The eighth zone includes taking up the first and second plastic film or sheet on separate takeup rollers so that the plastic sheets can be used for packaging or the like or even be reused on the reverse side in the mold or die making process. The ninth zone involves separating the cured finished products which are attached end-to-end as the finished products exit the heating chamber 10. Water jets or saws separate the finished products which are then allowed to cool at room temperature up to 24 hours. As the first conveyor belt 3 is carried about the last roller, the mixture substance is allowed to drop onto a second conveyor belt 11 disposed below the first conveyor belt 3 and moving in the opposite direction as the first conveyor belt 3, and is deposited in the holding bin 1 for reuse in the mold or die making process. Only a finite amount of mixture substance is needed to continuously make the molds or dies. The end-to-end hardened finished products are urged through a separator where water jets or saws separate the end-to-end hardened finished products into separate selected products. The following are examples of finished products which are made from this continuous mold or die making process:

EXAMPLE 1

For the production of specific textured and profiled synthetic ceramic shingle tiles. This molding process forms these tiles to a uniform size, width, and length or to a random pattern. Valleys are roll formed in the mixture substance or molds by the imprint roller or drum. The shingle tiles would be reversed out of the molds and would have negative depressions to represent the natural three dimensional appearance on buildings or structures having shingled roofs.

EXAMPLE 2

For the production of specific textured and profiled synthetic wood shake shingles. The imprint roller or drum would produce deep impressions in the molds and there would appear to be serrations in the molds. The finished product would be reversed out of the molds and the product would display the serrations and the heavy grains as negative depressions.

EXAMPLE 3

For the production of sidings replicating wood sidings. The imprint roller or drum would produce a specific grain and profile in the molds. The finished products would look like standard red wood sidings or other types of sidings.

EXAMPLE 4

For the production of walls replicating brick, rock, or block. The imprint roller or drum would produce a rough or coarse grain in a positive element, which when the finished products are reversed out of the molds the finished products would show negative depressions, cracks, holes, and other pieces.

EXAMPLE 5

For the production of plywood-like and cut wood-like boards, sheets, and panels having wood-like grain texture including knots and blemishes formed by the imprint roller or drum.

EXAMPLE 6

For the production of synthetic look-a-like wood logs having logs without bark and replicating the wood grains, knots, blemishes, nails, and pegs, the grains, knots, and blemishes being a product of the imprinting process using the imprint roller or drum.

Various changes and departures may be made to the invention without departing from the spirit and scope thereof. Accordingly, it is not intended that the invention be limited to that specifically described in the specification or as illustrated in the drawing but only as set forth in the claims.

What is claimed is:

1. A continuous flow process of making molds or dies using a reusable, bondable mixture substance to make finished products comprising the steps of:

supplying said reusable, bondable mixture substance;

dispensing said bondable mixture substance onto a first conveyor belt;

arranging said bondable mixture substance on said first conveyor belt;

covering said bondable mixture substance with a first plastic sheet; making impressions in said bondable mixture substance and on said first plastic sheet to make said molds or dies;

dispensing a liquified hardenable material onto said molds or dies;

forming said finished products;

separating said bondable mixture substance from said finished products; and reusing said bondable mixture substance to continue to make said molds or dies.

2. A continuous flow process of making molds or dies using a reusable, bondable mixture substance to make finished products as described in claim 1, wherein said bondable mixture substance is being continuously dispensed onto said first conveyor belt which is continuously dispensed onto said first conveyor belt which is continuously moving during operation of said continuous flow process.

3. A continuous flow process of making molds or dies using a reusable, bondable mixture substance to make finished products as described in claim 1, wherein the step of arranging said bondable mixture substance on said first conveyor belt further includes leveling or grading said bondable mixture substance and flattening said bondable mixture substance so that said bondable mixture substance substantially coheres for making said molds or dies.

4. A continuous flow process of making molds or dies using a reusable, bondable mixture substance to make finished products a described in claim 1, wherein said molds are being continuously made end to end.

5. A continuous flow process of making molds or dies using a reusable, bondable mixture substance to make finished products as described in claim 1, wherein the step of dispensing said liquified hardenable material onto said molds or dies further includes dispensing said liquified hardenable material onto said first plastic sheet covering said molds or dies.

6. A continuous flow process of making molds or dies using a reusable, bondable mixture substance to make finished products as described in claim 5, wherein the step of dispensing said liquified hardenable material onto said molds or dies further includes dispensing a polymeric material onto said first plastic sheet.

7. A continuous flow process of making molds or dies using a reusable, bondable mixture substance to make finished products as described in claim 1, wherein the step of making said finished products further includes covering said hardenable material with a second plastic sheet; and applying heat to cure said hardenable material to form said finished products.

8. A continuous flow process of making molds or dies using a reusable, bondable mixture substance to make finished products as described in claim 7, wherein the step of making said finished products includes making finished products which are continuously being made during said continuous flow process and which are essentially connected end-to-end and which are separated from one another.

9. A continuous flow process of making molds or dies using a reusable, bondable mixture substance to make finished products as described in claim 1, wherein the step of allowing said mixture substance to separate from said finished products further includes dropping of said mixture substance from said first conveyor belt to a second conveyor belt; and returning said mixture substance to a holding bin.

10. A continuous flow process of making molds or dies using a reusable, bondable mixture substance to make finished products as described in claim 7, wherein the step of allowing said mixture substance to separate from said finished products further includes removing said first and said second plastic sheets from said finished products and said mixture substance.

\* \* \* \* \*